(12) United States Patent
Beck et al.

(10) Patent No.: US 10,487,548 B2
(45) Date of Patent: Nov. 26, 2019

(54) DOOR HANDLE OF A VEHICLE WITH A TENSION MEANS

(71) Applicant: Huf Hülsbeck & Fürst GmbH & Co. KG, Velbert (DE)

(72) Inventors: Andreas Beck, Bochum (DE); Martin Witte, Ahaus (DE); Ulrike Fichert, Wuppertal (DE); Igor Gorenzweig, Wuppertal (DE); Stefan Mönig, Schwelm (DE)

(73) Assignee: Huf Hülsbeck & Fürst GmbH & Co. KG, Velbert (DE)

( * ) Notice: Subject to any disclaimer, the term of this patent is extended or adjusted under 35 U.S.C. 154(b) by 795 days.

(21) Appl. No.: 14/941,479

(22) Filed: Nov. 13, 2015

(65) Prior Publication Data

US 2016/0138303 A1 May 19, 2016

(30) Foreign Application Priority Data

Nov. 13, 2014 (DE) .................. 10 2014 116 641
Jun. 30, 2015 (EP) .................. 15 174 635

(51) Int. Cl.
*E05B 85/10* (2014.01)
*E05B 79/06* (2014.01)
(Continued)

(52) U.S. Cl.
CPC .............. *E05B 81/77* (2013.01); *B60J 5/04* (2013.01); *E05B 17/10* (2013.01); *E05B 17/14* (2013.01); *E05B 17/183* (2013.01); *E05B 77/34* (2013.01); *E05B 79/04* (2013.01); *E05B 79/06* (2013.01); *E05B 79/20* (2013.01); *E05B 81/04* (2013.01); *E05B 81/10* (2013.01); *E05B 81/56* (2013.01); *E05B 81/82* (2013.01); *E05B 81/86* (2013.01);
(Continued)

(58) Field of Classification Search
CPC .......... E05B 79/20; E05B 81/76; E05B 81/77; E05B 85/10; Y10T 292/57
USPC ...................................... 292/336.3
See application file for complete search history.

(56) References Cited

U.S. PATENT DOCUMENTS 1,369,506 A 2/1921 Voight
1,618,997 A 3/1927 Radandt
(Continued)

FOREIGN PATENT DOCUMENTS

CN 102575487 A 6/2012
CN 102597400 A 6/2012
(Continued)

OTHER PUBLICATIONS

European Search Report, dated Apr. 7, 2016, for corresponding European Patent No. 15 17 4635 with English translation.
(Continued)

*Primary Examiner* — Carlos Lugo
(74) *Attorney, Agent, or Firm* — Intellectual Property Law Group LLP

(57) ABSTRACT

The invention relates to a door handle (30) for a vehicle door (40) of a vehicle with a tension means (10), wherein the tension means (30) can in particular be mechanically operatively connected with a detachable cover element (31), and a container element (20), wherein the container element (20) is situated inside of the door handle (30), and designed to accept a functional element (33) of the door handle (30).

13 Claims, 4 Drawing Sheets

(51) Int. Cl.

| | | |
|---|---|---|
| E05B 17/18 | (2006.01) | |
| E05B 79/20 | (2014.01) | |
| E05B 81/90 | (2014.01) | |
| E05B 17/10 | (2006.01) | |
| E05B 79/04 | (2014.01) | |
| E05B 81/04 | (2014.01) | |
| E05B 81/10 | (2014.01) | |
| E05B 81/56 | (2014.01) | |
| B60J 5/04 | (2006.01) | |
| E05B 17/14 | (2006.01) | |
| E05B 77/34 | (2014.01) | |
| E05B 81/82 | (2014.01) | |
| E05B 81/86 | (2014.01) | |
| E05B 85/02 | (2014.01) | |
| F21V 3/06 | (2018.01) | |
| E05B 79/10 | (2014.01) | |
| E05B 79/08 | (2014.01) | |

(52) U.S. Cl.
CPC .............. *E05B 81/90* (2013.01); *E05B 85/02* (2013.01); *E05B 85/10* (2013.01); *F21V 3/062* (2018.02); *E05B 79/08* (2013.01); *E05B 79/10* (2013.01); *Y10S 292/22* (2013.01); *Y10T 292/1047* (2015.04); *Y10T 292/1078* (2015.04); *Y10T 292/57* (2015.04)

(56) References Cited

U.S. PATENT DOCUMENTS

| | | | |
|---|---|---|---|
| 1,961,456 A | 6/1934 | Rubner | |
| 2,096,568 A | 10/1937 | Snively | |
| 2,904,985 A | 9/1959 | Murphy | |
| 4,023,388 A | 5/1977 | Morvai | |
| 4,290,279 A | 9/1981 | Fish et al. | |
| 4,544,189 A * | 10/1985 | Fiordellisi | E05B 79/20 |
| | | | 292/336.3 |
| 4,594,866 A | 6/1986 | Neyret | |
| 4,709,567 A | 12/1987 | Appelbaum | |
| 4,825,673 A | 5/1989 | Drake | |
| 5,109,686 A | 5/1992 | Toussant | |
| 5,236,233 A * | 8/1993 | Fukumoto | E05B 47/0012 |
| | | | 292/144 |
| 5,241,846 A | 9/1993 | Hoke | |
| 5,394,711 A | 3/1995 | Pitkanen | |
| 5,720,379 A | 2/1998 | Schwartz et al. | |
| 5,815,379 A | 9/1998 | Mundt | |
| D408,262 S | 4/1999 | Liu | |
| 6,405,571 B2 * | 6/2002 | Tyas | E05B 79/12 |
| | | | 474/53 |
| 6,467,316 B1 | 10/2002 | Chen | |
| 6,494,070 B1 | 12/2002 | Moss et al. | |
| 6,497,445 B1 | 12/2002 | Combs | |
| 6,908,140 B1 * | 6/2005 | Carter | B60R 16/0215 |
| | | | 296/146.1 |
| 7,199,317 B2 * | 4/2007 | Ieda | E05B 81/78 |
| | | | 200/600 |
| 7,322,218 B2 | 1/2008 | Yonemura et al. | |
| 7,363,786 B2 | 4/2008 | TerHaar et al. | |
| 7,581,423 B2 | 9/2009 | Brojanac et al. | |
| 7,598,915 B2 * | 10/2009 | Ieda | B60R 25/246 |
| | | | 343/713 |
| 7,819,442 B2 * | 10/2010 | Ieda | B60R 25/24 |
| | | | 292/336.3 |
| 8,636,309 B2 * | 1/2014 | Muller | E05B 81/78 |
| | | | 292/336.3 |
| 9,164,125 B2 * | 10/2015 | Tsurumaki | E05B 81/77 |
| 9,556,655 B2 * | 1/2017 | Shimizu | E05B 81/76 |
| 9,631,398 B1 | 4/2017 | Liu | |
| 2004/0055342 A1 | 3/2004 | Chen | |
| 2005/0264024 A1 | 12/2005 | Mulder et al. | |
| 2006/0061941 A1 * | 3/2006 | Spies | B60R 16/0215 |
| | | | 361/600 |
| 2007/0096905 A1 * | 5/2007 | Ieda | B60R 25/246 |
| | | | 340/562 |
| 2007/0115191 A1 * | 5/2007 | Hashiguchi | E05B 81/78 |
| | | | 343/713 |
| 2007/0193320 A1 | 8/2007 | Niskanen | |
| 2007/0200359 A1 | 8/2007 | Lewis et al. | |
| 2009/0205383 A1 | 8/2009 | Katagiri et al. | |
| 2009/0279826 A1 * | 11/2009 | Ieda | B60Q 1/2669 |
| | | | 385/13 |
| 2010/0031714 A1 | 2/2010 | Brown et al. | |
| 2010/0107803 A1 | 5/2010 | Ramsauer et al. | |
| 2010/0162777 A1 | 7/2010 | Savant | |
| 2010/0237635 A1 * | 9/2010 | Ieda | E05B 81/78 |
| | | | 292/336.3 |
| 2010/0293753 A1 | 11/2010 | Saitou | |
| 2012/0205924 A1 | 8/2012 | Müller et al. | |
| 2012/0205925 A1 | 8/2012 | Muller | |
| 2013/0098123 A1 | 4/2013 | Gorontzi et al. | |
| 2014/0000167 A1 | 1/2014 | Patel | |
| 2014/0047877 A1 | 2/2014 | Böhm et al. | |
| 2014/0062100 A1 | 3/2014 | Tamura | |
| 2014/0125071 A1 * | 5/2014 | McWilliams | E05B 17/183 |
| | | | 292/336.3 |
| 2014/0272305 A1 | 9/2014 | Helmy et al. | |
| 2016/0138303 A1 | 5/2016 | Beck | |
| 2016/0319573 A1 | 11/2016 | De Deppo et al. | |
| 2017/0058563 A1 | 3/2017 | Ichikawa et al. | |
| 2017/0292297 A1 | 10/2017 | Bartels et al. | |

FOREIGN PATENT DOCUMENTS

| | | | | |
|---|---|---|---|---|
| CN | 103339334 A | 10/2013 | | |
| CN | 203835089 U | 9/2014 | | |
| DE | 198 24 344 A1 | 12/1999 | | |
| DE | 103 09 821 A1 | 9/2004 | | |
| DE | 10307364 A1 * | 9/2004 | ........... | E05B 1/0092 |
| DE | 10307364 A1 | 9/2004 | | |
| DE | 10324890 A1 | 12/2004 | | |
| DE | 10341832 A1 * | 4/2005 | ............. | E05B 85/16 |
| DE | 10341832 A1 | 4/2005 | | |
| DE | 20 2008 011297 U1 | 11/2008 | | |
| DE | 102009045872 A1 | 4/2011 | | |
| DE | 102013112122 A1 * | 5/2015 | ........... | E05B 53/001 |
| DE | 102013112122 A1 | 5/2015 | | |
| EP | 0 006 10 A2 | 3/1979 | | |
| EP | 0 516 992 A1 | 12/1992 | | |
| EP | 0 522 278 A1 | 1/1993 | | |
| EP | H 11 192660 A | 7/1999 | | |
| EP | 1 473 423 A2 | 11/2004 | | |
| EP | 1 616 687 A1 | 1/2006 | | |
| EP | 2 096 237 A2 | 9/2009 | | |
| EP | 2 284 339 A2 | 2/2011 | | |
| EP | 3020892 A1 * | 5/2016 | ............. | E05B 79/04 |
| EP | 3020892 A1 | 5/2016 | | |
| WO | WO2010/072678 A1 | 7/2010 | | |

OTHER PUBLICATIONS

Extended European Search Report, dated Apr. 7, 2016, for corresponding European Patent No. 15 19 4090 with English translation.
China Office Action dated Aug. 2, 2018 for corresponding China application No. 201510771388.X (English version).
China Office Action dated Aug. 28, 2018 for corresponding China application No. 201510779901.X (English version).
International Search Report, dated Sep. 14, 2016, for corresponding International Application No. PCT/EP2016/062810 with English translation.
Written Opinion, dated Sep. 14, 2016, for corresponding International Application No. PCT/EP2016/062810 with English translation.
International Preliminary Report on Patentability, dated Aug. 21, 2017, for corresponding International Application No. PCT/EP2016/062810 with English translation.
Alois Körber, Analysis and Optimization of the Molecular Orientation Angle of Biaxially Stretched Poly(ethylene terephthalate) Film Webs, 2014 (PhD Thesis), https://mediatum.ub.tum.de/1167050.

(56) References Cited

OTHER PUBLICATIONS

European Office Action dated Sep. 21, 2018 for corresponding European application No. 15 194 090.5 with English translation.

\* cited by examiner

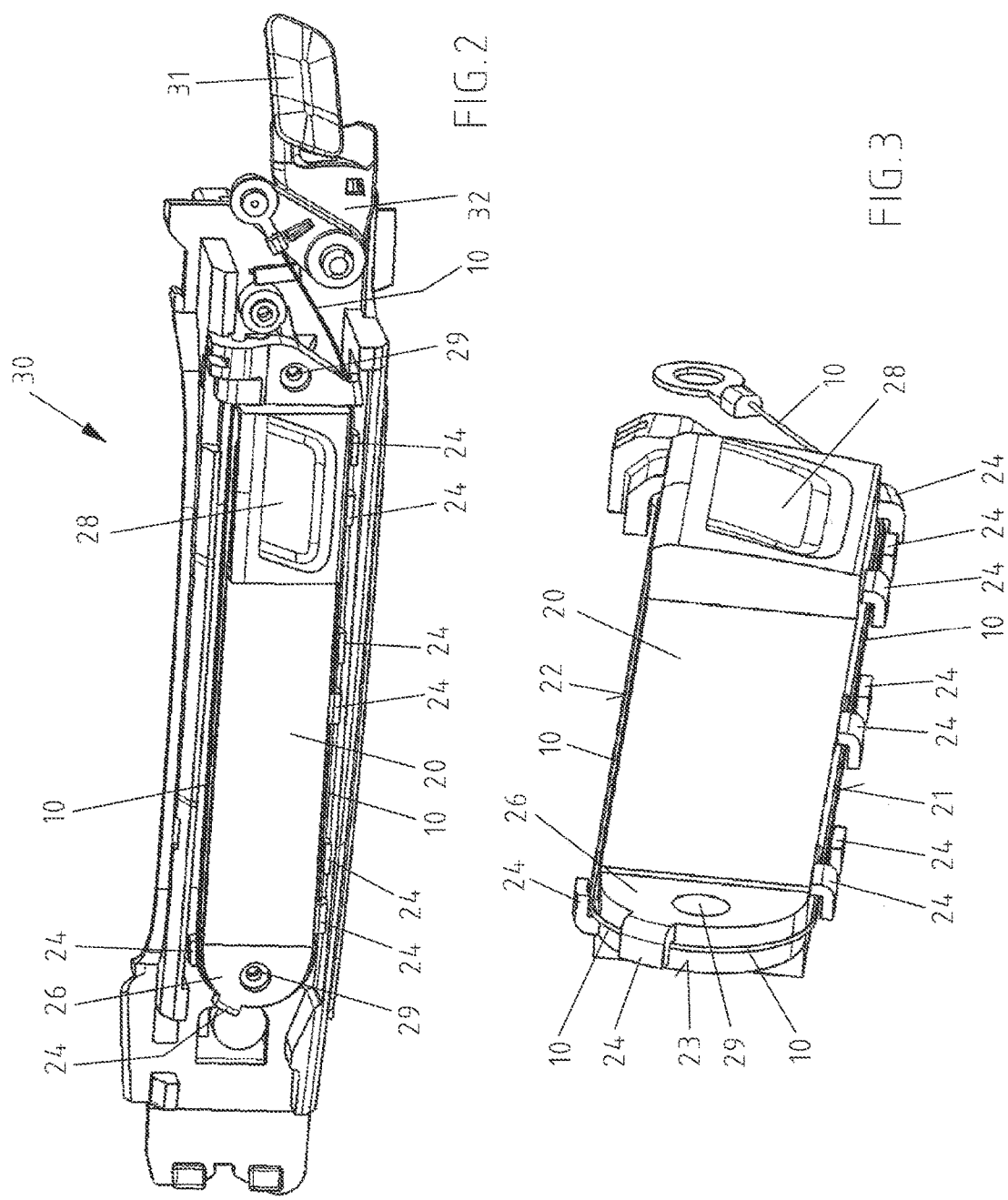

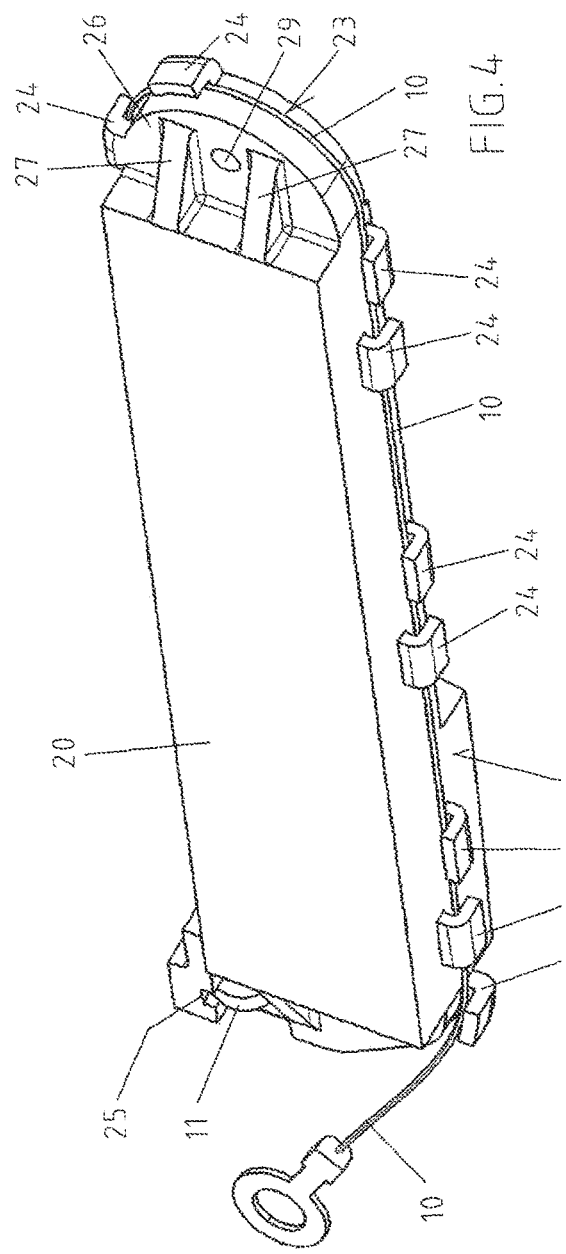
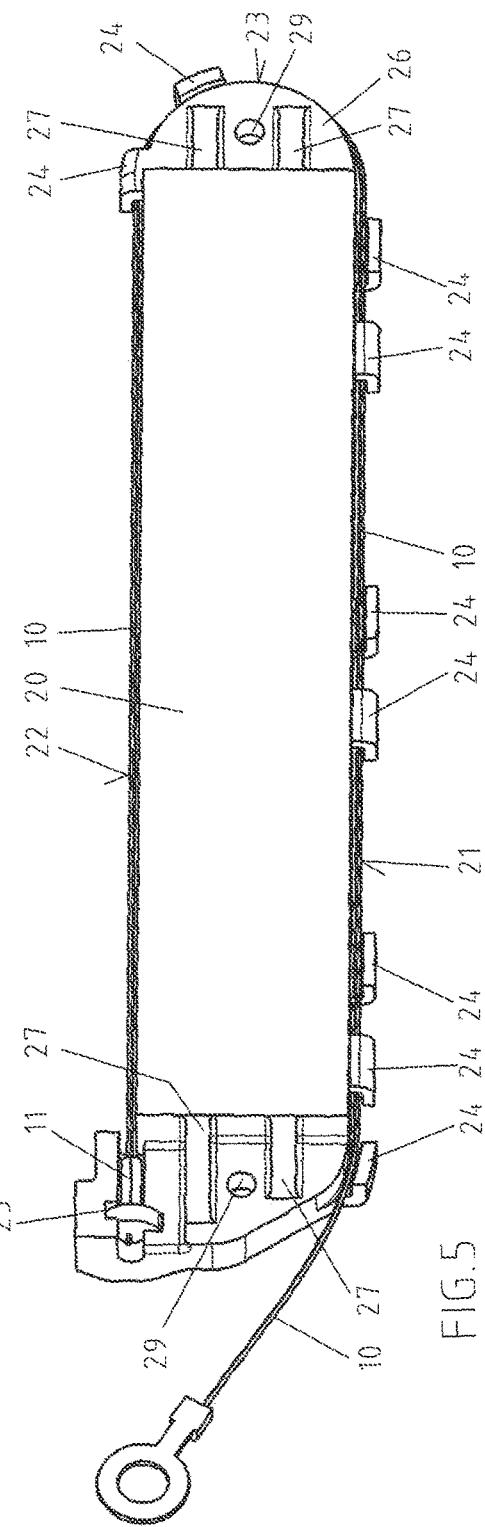

DOOR HANDLE OF A VEHICLE WITH A TENSION MEANS

CROSS-REFERENCE TO RELATED APPLICATIONS

This application claims priority to German application No. 10 2014 116 641.8 filed on Nov. 13, 2014, and to European application No. 15 174 635.1 filed on Jun. 30, 2015, each of which is hereby incorporated by reference in its entirety.

BACKGROUND OF THE INVENTION

1. Field of the Invention

The present invention relates to a door handle for a vehicle door or vehicle hatch of a motor vehicle. The door handle here exhibits a tension means, wherein the tension means can in particular be mechanically operatively connected with a detachable cover element, and a container element, wherein the container element is situated inside of the door handle, and designed to accept a functional element of the door handle.

2. Background

Known for modern vehicles is to provide an emergency device with which the vehicle door or vehicle hatch can be opened, in particular in an emergency situation, e.g., given a dangerous lateral position, a power failure, an accident or the like. In particular in fixed door handles, the electronics of which during normal operation detects the intended actuation by a user with sensors and opens the door, such an emergency device can significantly increase the security for a user of the vehicle, since the electrical power necessary for operating the sensors may no longer be available in an emergency situation, for example. As a consequence, the door can be opened at any time, in particular from outside as well. Such an emergency device can here in particular also encompass a tension means, wherein the vehicle door can be manually opened by actuating the tension means. Such a tension means should here be fixed in place in the door handle, secured against loss.

SUMMARY OF THE INVENTION

Therefore, the object of the present invention is to create a door handle for a vehicle door that at least partially overcomes at least one of the mentioned disadvantages. In particular, the object of the invention is to provide a door handle that enables an easy and cost-effective arrangement of a tension means in the door handle.

Proposed for achieving this object is a door handle to which the following special importance is attributed. Practical embodiments of the invention are described throughout the description and drawings. To the extent appropriate, technical features of the door handle according to the invention apply in equal measure to various embodiments of the latter, thus allowing reciprocal references in this regard.

The object is achieved by a door handle of a vehicle door or vehicle hatch (in very general terms: a movable part) of a vehicle with a tension means, wherein the tension means in particular can be mechanically operatively connected with a removable cover element, and a container element, wherein the container element is situated inside of the door handle, and designed to accept a functional element of the door handle. A door handle according to the invention is characterized by the fact that the container element is designed to guide the tension means.

For example, a door handle according to the invention can here be a movable, but in particular also a fixed, door handle of a vehicle door. In particular in such a fixed door handle, for example, the tension means of the door handle can be provided for manually actuating a door lock. A cover element, for example designed for covering a lock cylinder, can be mechanically operatively connected with the tension means, as a result of which in particular the cover element can be fixed in place. This can also simplify the actuation of the tension means, for example, but also can provide an anti-loss protection for the cover element. Alternatively or additionally, the tension means in the door handle can also be designed for securing, triggering and/or actuating other devices and/or elements of the door handle and/or the vehicle door. Aside from the tension means, a door handle according to the invention exhibits at least one container element, which is situated inside of the door handle. To this end, for example, a hollow space of the door handle can be provided for accepting the container element inside of the door handle. Such a door handle can for this purpose consist of at least two parts, with a lower part and an upper part, so as to yield the hollow space. The container element can here be rectangular or at least essentially rectangular, and especially preferably be adjusted to a shape of the hollow space in the door handle. The container element can also have acceptances for fixing means to fasten and/or fix the container element in the door handle. The container element is in turn designed to accept a functional element of the door handle. To this end, the container element exhibits an acceptance, if necessary also a hollow space, for arranging the functional element in the container element. For example, a functional element can here include electronics, such as a sensor array or a lighting, a heater, a drive or the like. This electronics can also be protected and/or encapsulated by a potting compound and accepted inside of the container element.

It is essential to the invention of a door handle according to the invention that the container element is designed to guide the tension means. By guiding the tension means using the container element, a position of the tension means relative to the container element can be established. As a result, the traction element can be automatically fixed in the door handle, and be situated in particular so as to function reliably and be safeguarded against loss. In particular, a guide here does not yield a rigid connection between the tension means and container element. Therefore, an actuation of the tension means, e.g., which in particular is accompanied by a movement of the tension means along its extension, can take place at any time, and in particular without any impediment resulting from the process of being guided by the container element. In particular providing that the tension means be guided by the container element can eliminate the need for any additional devices for fixing the tension means in the door handle. This makes it possible to reduce the requirement for installation space, and in particular the time and cost associated with the production and assembly of the door handle. As a whole, then, a container element designed for guiding the tension means enables the realization of an especially simple, compact and cost-effective arrangement and fixation of the tension means in or on the door handle.

It can further be provided in a door handle according to the invention that the tension means is guided along a first outer wall of the container element, and in particular is guided along a second outer wall of the container element lying opposite the first. According to the invention, along the outer wall of the container element here means in particular that the tension means is guided over the entire length or at least essentially over the entire length of the outer wall of the container element. This makes it possible to provide an especially good guide for the tension means, since the tension means can thereby be guided not just selectively at one location, but at several locations distributed over in particular the entire length of the outer wall. Of course, it is also conceivable to guide the tension means not just selectively, but also extensively or sectionally, along at least one portion of the outer wall. Optional guiding along a second outer wall to go along with the guidance along the first wall can even further improve the fixed arrangement of the tension means via its guidance on the container element. In particular, this can be attributed to the fact that the second outer wall is arranged opposite the first, so that the tension means is guided on two at least essentially parallel outer walls of the container element. It is especially preferred here that the first and second outer walls extend in a direction of the container element in which the container element exhibits a large expansion. This makes it possible to improve the guidance of the tension means on the container element even further.

A door handle according to the invention can also be further developed by guiding the tension means on a third outer wall of the container element, in particular a third outer wall situated between the first outer wall and second outer wall, at least sectionally in an arc-shaped, in particular circular-arc-shaped, manner. By an arc-shaped guiding, in particular circular-arc-shaped guiding, an arrangement direction of the tension means can be altered, without having to guide it over and/or around a sharp edge of the container element and/or kink the tension means. When actuating the tension means, which most often happens in the direction in which the tension means extends, arc-shaped guiding allows the tension means to be easily moved without limitation and an elevated expenditure of force, without having to worry about the tension means becoming damaged on a sharp edge and/or by a kink in the tension means. In particular, by such an arc-shaped, in particular circular-arc-shaped, guiding along a third outer wall situated between the first and second outer wall the tension means can be guided especially easily and reliably on all three outer walls, and in particular actuated as well.

The door handle according to the invention can further provide that the third outer wall of the container element be situated on a D-shaped projection of the container element. In particular, a projection can here be a massive section of the container element. Within the meaning of the invention, D-shaped here means in particular that a section of the projection comprising a third outer wall of the container element is arc-shaped, in particular circular-arc-shaped, in design. It is here especially preferable for the third wall to extend from the first to the second outer wall, adjoin the latter without any respective edge, and be arc-shaped in design between the latter. This makes it possible to guide the tension means especially well and smoothly on the first, second and third outer walls of the container element.

A door handle according to the invention can also be further developed by having the D-shaped projection be supported and/or reinforced by at least one reinforcing rib. As described above, a projection is an in particular massive section of the container element. As a result, the projection exhibits no hollow space for accepting a functional element, and can thus exhibit less of an extension than the remaining container element, at least in a direction in space. In this case in particular, a reinforcing rib that preferably extends between the remaining container element and the projection and supports the latter against the container element constitutes an especially easy way to increase the stability of the extension. Of course, several of such reinforcing ribs can be provided for supporting the projection if technically possible and feasible.

An especially preferred embodiment of a door handle according to the invention can further provide that guide elements be situated on the container element, in particular on at least one outer wall of the container element, wherein the guide elements are designed to guide, in particular to form-fittingly guide, the tension means on the container element. Such guide elements make it especially easy to guide the tension means via the container element, since in particular not the entire container element needs not to be configured for guiding the tension means. The guiding means can here preferably be situated on an outer wall of the container element along which the tension means is guided. In particular, form-fittingly guiding the tension means makes it possible to actuate the tension means at any time. This stands in contrast in particular to a force-fitting and/or materially bonding arrangement of the tension means, which makes it impossible or at least considerably more difficult to move, and thus actuate, the tension means.

A door handle according to the invention can also be further developed so as to give the guide elements an L-shaped design, wherein, in particular along the tension means, at least two of the L-shaped guide elements are situated in a mirror-inverted manner on the container element, in particular on the outer wall of the container element, so as to in particular form a closed acceptance. According to the invention, L-shaped here means in particular that the guide elements exhibit at least two sections, which adjoin each other in such a way as to include an angle of less than approx. 135°, preferably an angle of approx. 90°. It is especially preferred that the L-shaped guide elements be situated on the container element in such a way that they are joined with an outer wall of the container element with the first section, and the second section extends essentially parallel to the outer wall. Therefore, the tension means can be guided form-fittingly especially easy perpendicular to the extension of the tension means in at least three of the four directions in space, in particular via the outer wall and the two sections of the L-shaped guide element. The tension means can also be hooked into the L-shaped guide element, for example, thereby making the door handle easier to assemble. Arranging at least two of the L-shaped guide elements in a mirror-inverted manner, wherein the two guide elements are situated so that the respective first section of the guide elements is located on different sides of the tension means, a form-fitted guidance of the tension means can be realized perpendicular to the extension of the tension means in all four directions in space.

A door handle according to the invention can further provide that the guide elements are designed for supporting the container element (simultaneously) in the door handle. In particular, this kind of support here preferably involves form-fittingly fixing the container element in the door handle, especially in a hollow space in the door handle. As a result, the container element can be prevented from moving in the hollow space of the door handle, thereby reducing or even entirely avoiding any noise, e.g., rattling, that might be caused by such a movement. In particular, the entire container element also need not be tailored to the shape of the hollow space, since the guide elements already ensure that the container element is supported and fixed in the hollow space of the door handle. This makes it possible to economize on material during the manufacture of the container element and/or door handle.

In addition, a door handle according to the invention can be designed in such a way that the container element exhibits a tension means end acceptance for accepting, in particular form-fittingly suspending, a tension means end of the tension means. Guiding the tension means on the container element most often causes the tension means to become fixed perpendicular to the extension of the tension means in the four directions in space. By accepting a tension means end in a tension means end acceptance, at least one of the two directions in space can also be covered along the extension of the tension means, especially preferably both directions in space along the extension of the tension means. Form-fittingly suspending a tension means end in a correspondingly shaped tension means end acceptance here represents a particularly easy way to fix the tension means end in place in such a way.

The invention can additionally provide that the tension means be designed for mechanically actuating a door lock. Apart from that, the invention can provide that the door lock be mechanically and/or electrically activatable in design. The tension means advantageously enables a mechanical actuation of the door lock if the electronics fails or no power is available for actuating the door lock during normal operation. The invention can here be used in equal measure for purely mechanical or purely electrical as well as combination (door) locks. Use of the door handle according to the invention is advantageous for other technologies as well, such as sensor, pushbutton or piezo element-controlled door locks, which in part require that the door lock be electrically actuated. As a result, a door handle according to the invention always makes it possible to open the vehicle door in case of an emergency.

The tension means can advantageously be flexible in design, taking the form of a Bowden cable, wire rope or plastic rope or a chain. It is also conceivable that the tension means can be made out of a flexible, for example elastic, material. Not only bendable metals, such as steel, are here conceivable as suitable materials, so too are plastics, such as fiber-reinforced plastics. For example, the achievable advantage here is that the tension means can be used to easily gain access to an emergency actuator, situated in the outer door handle, of a mechanism for opening a door or door lock. The tension means can also exhibit a shape memory wire, which is deformed into a predefined state during exposure to electrical power, wherein this deformation can be utilized for mechanically triggering a function. Such a tension means requires no driving means to generate a tensile force, since the deformation already generates the tensile force.

A door handle according to the invention can further especially preferably provide that the tension means be part of a rope hoist device. A rope hoist device is here a simple mechanical machine in which a force is conveyed via the tension means. In particular by the pulling on one end of the tension means by a user, the tension means as part of the rope hoist device can be used to initiate a process inside of the vehicle door, e.g., for opening a door lock. A rope hoist device here offers an especially simple way of relaying an actuation of the tension means into the interior of the vehicle door.

A door handle according to the invention can also be designed in such a way that the tension means can be actuated by a driving means, in particular a mechanical, electrical, hydraulic, pneumatic and/or pyrotechnic driving means. Aside from manually actuating the traction device, a driving means can of course alternatively or additionally be provided for actuating the tension means. Such a driving means can make it possible to actuate the tension means even without a direct manual actuation by a user. In addition, the driving means can be designed as part of the container element. The driving means can also be situated in and/or on the container element. The wide range of options available for configuring and arranging the driving means make it possible to drive the tension means in a manner especially well tailored to the respective requirements.

According to the invention, the cover element and tension means can be connected directly or by a joining means. The joining means can here take the form of an acceptance, a hook, an eyelet, a clamp or a clip, in particular formed on the cover element, so as to engage onto the tension means. For example, the resultant advantage is that the tension means can be easily connected with the cover element. In particular within the framework of the assembly process, one end of the tension means can be quickly and easily connected with the joining element. As a result, both the pure mechanical actuation of the tension means and the activation of the tension means owing to an emergency situation via the cover element can be simplified.

In a door handle according to the invention, it can preferably further be provided that the functional element encompass the electronics of the door handle. Within the meaning of the invention, the electronics can encompass, for example, a printed circuit board, a sensor arrangement and/or a lighting device. Of course, the functional element can also incorporate a power supply for the electronics. For example, a sensor arrangement can further exhibit capacitive, inductive, optical, thermal sensors and/or pressure sensors. The electronics can also be cast in the container element. This makes it possible to create a design for a door handle according to the invention that is especially versatile and adjustable to a wide range of requirements.

A door handle according to the invention can preferably be further developed in such a way that the electronics exhibit a lighting device, and that the container element exhibits at least one light outlet for allowing light to pass through. For example, such a lighting device can be provided for an apron lighting and/or trough lighting. In particular, having a light outlet as part of the container element can make it possible to design the lighting device as part of the electronics inside of the container element. The light generated by the lighting device can exit the container element through the light outlet and be relayed to the corresponding area to be illuminated. This makes it possible to avoid external lighting devices situated outside of the container element. As a result, a door handle according to the invention can be designed simpler, so that time and costs can be economized in particular during the manufacturing process.

Further, it is especially preferred for a door handle according to the invention to provide that the container element exhibits a transparent material at least in the area of the at least one light outlet, in particular a transparent polycarbonate and/or a transparent polymethyl methacrylate. As a result of using a transparent material at least in the area of the at least one light outlet, the container element can be given a continuously sealed design in the area of the at least one light outlet as well, and in particular does not have to exhibit a hole. An integral stability of the container element can be increased in this way. In particular a transparent polycarbonate and/or a transparent polymethyl methacrylate here represent especially suitable materials for ensuring a high stability of the container element on the one hand, and providing a high light transmittance in the area of the light outlet on the other. If technically feasible and possible, of course, the entire container element can be made out of a suitable transparent material, so that a one-piece, in particular monolithic, configuration of the container element can be enabled that is especially simple and cost effective to manufacture.

The door handle according to the invention can be fabricated as a plastic injection molded part in one or several pieces. Further, the door handle can exhibit an emergency device comprised at least partially of the cover element and/or tension means.

BRIEF DESCRIPTION OF THE DRAWINGS

Additional measures and advantages along with technical features of the invention may be gleaned from the claims, the following description and the drawings. Different features may here be advantageously taken in isolation and in any desired combination without departing from the framework of the invention. On the figures below, the door handle according to the invention is shown in detail in several exemplary embodiments. The following figures use identical reference numbers for the same technical features, even those from different exemplary embodiments. Shown in a respectively schematic manner on:

FIG. 2 is an interior view of a door handle according to the invention with a container element according to the invention based on a first embodiment;

FIG. 3 is a first perspective view of the container element according to the invention based on the first embodiment;

FIG. 4 is a second perspective view of the container element according to the invention based on the first embodiment;

FIG. 5 is a third perspective view of the container element according to the invention based on the first embodiment.

The following figures use identical reference numbers for the same technical features, even those from different exemplary embodiments.

DETAILED DESCRIPTION OF SPECIFIC EMBODIMENTS

Figure 1:
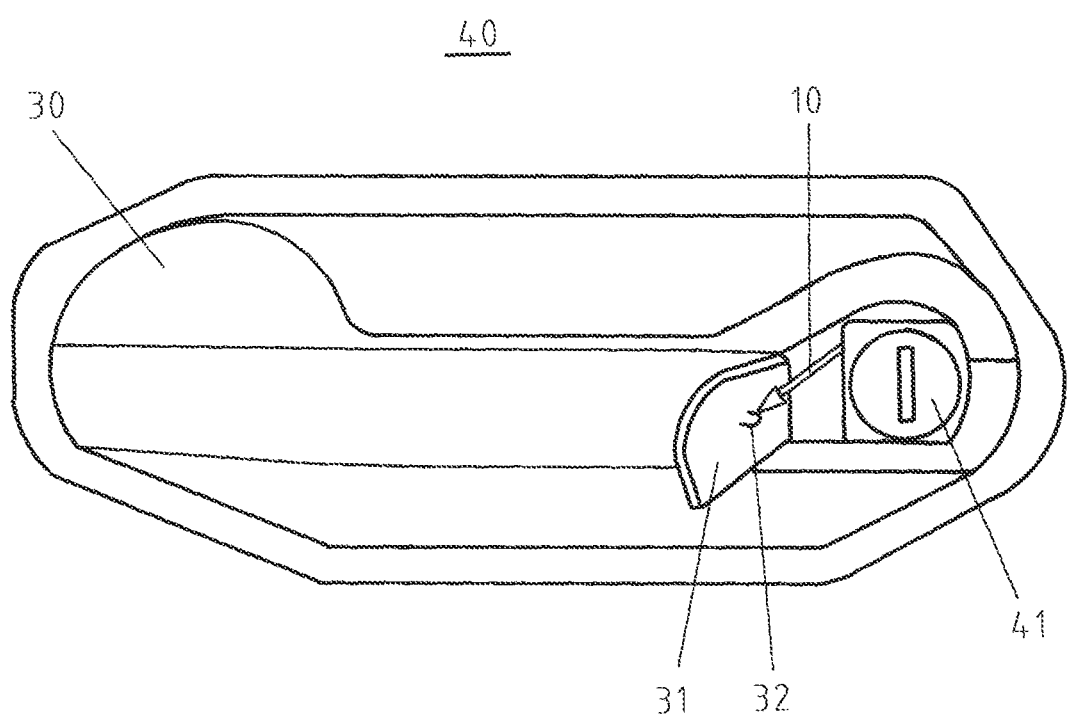
FIG. 1 is a door handle according to the invention.

FIG. 1 shows a door handle 30 according to the invention, which is situated on a vehicle door 40 or vehicle hatch 40. Of course, the door handle 30 can also be arranged on other movable vehicle parts, such as a tailgate. The door handle 30 is optionally further designed as a fixed door handle 30. The door handle 30 preferably incorporates a lock cylinder 41, which is covered by a cover element 31 in normal operation. This makes it possible to achieve a visually especially appealing door handle 30. In the state depicted, however, the cover element 31 is in an open position, thus making the lock cylinder 41 accessible. This can be advantageous in particular in situations where the vehicle door 40 cannot be automatically unlocked, since the lock cylinder 41 can in this way be actuated from outside, thereby making it possible to unlock the vehicle door d HO. In an emergency situation, e.g., given a dangerous lateral position, an accident or the like, the vehicle door 40 can also be unlocked by means of an emergency device. In order to be able to open the vehicle door 40 unlocked in this way, the door handle 30 according to the invention is provided with a tension means 10 in the illustrated embodiment that is operatively connected with a door lock (not shown), in particular by way of a rope hoist. Of course, the tension means 10 can also be used for driving, respectively actuating other devices in other embodiments. The tension means 10 is here operatively connected with the cover element 31 by a joining means 32, in particular mechanically operatively connected. For example, this makes it possible to improve the accessibility of the tension means 10, since the tension means 10 is as a result already pulled a little ways out of the door handle 30 when opening the cover element 31. In addition, the tension means 10 in this way comprises an anti-loss protection for the cover element 31.

FIG. 2 schematically depicts the inside of a door handle 30 according to the invention with a container element 20 in a first embodiment. This first embodiment of a container element 20 is also shown on FIGS. 3, 4 and 5, so that FIGS. 2 to 5 will be described together below.

The container element 20 is situated inside of the door handle 30, in particular in a hollow space inside of the door handle 30. In order to fasten and/or fix the container element 20 in the door handle 30, the container element 20 exhibits fixing acceptances 29, into which dowel pins, screws or the like can engage for fastening and/or fixing the container element 20, for example. The container element 20 is here designed for accepting a functional element 33 (not also shown). The functional element 33 can here preferably encompass electronics, for example a printed circuit board, a sensor arrangement or a lighting device, but also be designed as a heater or drive. The container element 20 further exhibits a light outlet 28, through which a light generated by a functional element 33 with a lighting can exit the container element 20. To this end, at least in the area of the light outlet 28 of the container element 20 exhibits a transparent material or a transparent polycarbonate and/or a transparent polymethyl methacrylate. A tension means 10 is likewise located at least essentially inside of the door handle 30. The tension means 10 can here preferably be flexible in design, taking the form of a Bowden cable, wire rope or plastic rope, and is here mechanically operatively connected at one end with a cover element 31 by way of a joining means 32 designed as a lever mechanism. It is essential to the invention that the container element 20 is designed to guide the tension means 10 inside of the door handle 30. In the embodiment shown, the container element 20 exhibits several guide elements 24 for this purpose, which are arranged on three outer walls 21, 22, 23 of the container element 20. In particular, a first outer wall 21 and a second outer wall 22 are here located opposite each other on the container element 20. The third outer wall 23 is situated on a massive D-shaped projection 26. The projection 26 is here supported by reinforcing ribs 27 against the remaining container element 20, making it possible to increase the stability of the entire container element 20. As a result of the D-shaped projection 26, the tension means 10 is automatically guided through the container element 20 in an arc-shaped manner in the area of the third outer wall 23, see in particular FIGS. 3 and 4. This makes it especially easy to move the tension means 10 along its direction of extension, in particular without any danger of the tension means 10 becoming damaged by an edge of the container element 20 or a kink in the tension means 10. Clearly evident as well, for example on FIG. 4, is that the guide elements 24 are L-shaped in design. As a result, the tension means 10 can be hooked into the respective L-shaped guide element 24, for example, thereby making the door handle 30 easier to assemble overall. The two sections of the guide elements 24 here include an angle of approx. 90°. In addition, the L-shaped guide elements 24 are arranged on the container element 20 in such a way that they are joined with an outer wall 21, 22, 23 with a first section of the container element 20, while a second section extends essentially parallel to the respective outer wall 21, 22, 23. Arranging a respective two of the guide elements 24 in a mirror-inverted manner makes it possible to form-fittingly guide the tension means 10 perpendicular to the extension of the tension means 10 in all four directions in space. A tension means end 11 is further situated, in particular suspended, in a tension means end acceptance 25 of the container element 20. As a result, a good and reliable fixation of the tension means 10 can be achieved even in a direction of extension of the tension means 10. As a whole, a container element 20 according to the invention can provide for a reliable guiding of the tension means 10 inside of the door handle 30. This eliminates the need for additional structural components for guiding and/or fixing the tension means 10. In addition, the guide elements 24 make it possible to also support the container element 20 inside of the door handle 30, especially in a form-fitting manner. As a result, the container element 20 can be reliably prevented from moving inside of the door handle 30, in particular in a hollow space inside of the door handle 30. This makes it possible in particular to also avoid noises, for example rattling, generated by such movements.

Figure 6:
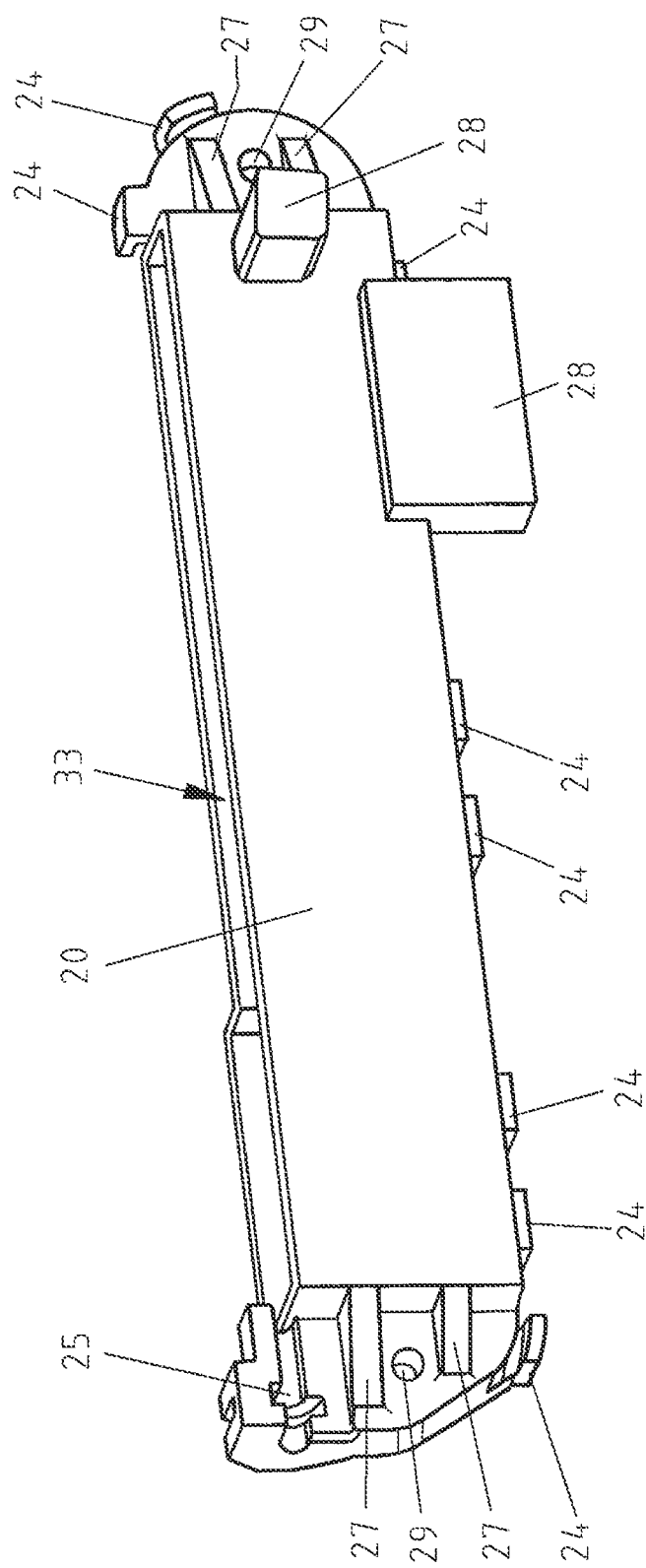
FIG. 6 is a perspective view of the container element according to the invention based on a second embodiment.

FIG. 6 shows another embodiment of a container element 20 according to the invention. As with the container element 20 illustrated on FIGS. 2 to 5, the container element 20 here exhibits L-shaped guide elements 24, a D-shaped projection 26 with reinforcing ribs 27 and fixing acceptances 29. Also visible is a hollow space in the container element 20, in which a functional element 33 can be situated. In particular, this functional element 33 here exhibits a lighting. The illustrated container element 20 exhibits two light outlets 28 for guiding out the light from this lighting device. In order to guide out the light, the container element 20 exhibits a transparent material at least in the area of the light outlet 28, for example a transparent polycarbonate and/or a transparent polymethyl methacrylate. If technically feasible and possible, of course, the entire container element 20 can be made out of a suitable transparent material. For example, the downwardly directed light outlet 28 can here be provided for apron lighting, and the second light outlet 28 for trough lighting. In particular, the presence of these light outlets 28 makes it possible for a lighting to be designed as part of the functional element 33, and arranged inside of the container element 20. The need for additional lighting devices located outside the container element 20 is eliminated. As a result, a door handle 30 according to the invention (not also shown) can be given a simpler structural design overall. This makes it possible to achieve a reduction in time and cost during the manufacture of a door handle 30 according to the invention.

REFERENCE LIST

10 Tension means
11 Tension means end
20 Container element
21 First outer wall
22 Second outer wall
23 Third outer wall
24 Guide element
25 Tension means end acceptance
26 Projection
27 Reinforcing rib
28 Light outlet
29 Fixing acceptance
30 Door handle
31 Cover element
32 Joining means
33 Functional element
40 Vehicle door/vehicle hatch
41 Lock cylinder

What is claimed is:

1. A door handle (30) assembly of a vehicle door (40) or a vehicle hatch (40), comprising:
   a door handle;
   a tension means (10) configured to aid in the opening of a vehicle lock in an emergency situation, wherein the tension means (10) is mechanically operatively connected with a detachable cover element (31), wherein upon pulling on the cover element (31) a force is exerted in a direction away from the vehicle door (40); and
   a container element (20), wherein the container element (20) is situated inside of the door handle (30) and designed to accept a functional element (33) of the door handle (30),
   characterized in that
   the container element (20) is designed for guiding the tension means (10);
   wherein the container element includes an outer wall along which the tension means is guided, the outer wall is situated on the container element and on a D-shaped projection (26) of the container element, and
   the D-shaped projection is supported by at least one reinforcing rib (27) that extends between the container element and the D-shaped projection.

2. The door handle (30) assembly according to claim 1, characterized in that
   the tension means (10) is guided along a first part of the outer wall (21) of the container element (20), and along a second part of the outer wall (22) of the container element (20), the second part of the outer wall lying opposite the first part of the outer wall.

3. The door handle (30) assembly according to claim 2, characterized in that
   the tension means (10) is guided on a third part of the outer wall (23) of the container element (20), the third part of the outer wall (23) situated between the first part of the outer wall (21) and second part of the outer wall (22), at least sectionally in an arc-shaped, in particular circular-arc-shaped, manner.

4. The door handle (30) assembly according to claim 3, characterized in that
   the third part of the outer wall (23) of the container element (20) is situated on the D-shaped projection (26) of the container element (20).

5. The door handle (30) assembly according to claim 1, characterized in that
   guide elements (24) are situated on the container element (20), in particular on at least one part of the outer wall (21, 22, 23) of the container element (20), wherein the guide elements (24) are designed to guide, in particular to form-fittingly guide, the tension means (10) on the container element (20).

6. The door handle (30) assembly according to claim 5, characterized in that
   the guide elements (24) are given an L-shaped design, wherein in particular along the tension means (10) at least two of the L-shaped guide elements (24) are situated in a mirror-inverted manner on the container element (20), in particular on the at least one part of the outer wall (21, 22, 23) of the container element (20).

7. The door handle (30) assembly according to claim 5, characterized in that
the guide elements (24) are designed for supporting the container element (20) in the door handle (30).

8. The door handle (30) assembly according to claim 1, characterized in that
the container element (20) exhibits a tension means end acceptance (25) for accepting, in particular form-fittingly suspending, a tension means end (11) of the tension means (10).

9. The door handle (30) assembly according to claim 1, characterized in that
the tension means (10) takes the form of a Bowden cable, wire rope or plastic rope or a chain, and that in particular the tension means (10) is made out of a flexible material.

10. The door handle (30) assembly according to claim 1, characterized in that
the cover element (31) and tension means (10) are connected directly or by a joining means (32).

11. The door handle (30) assembly according to claim 1, characterized in that
the functional element (33) encompasses electronics of the door handle (30).

12. The door handle (30) assembly according to claim 11, characterized in that
the electronics exhibits a lighting device, and that the container element (20) exhibits at least one light outlet (28) for allowing light to pass through.

13. The door handle (30) assembly according to claim 1, characterized in that
the container element (20) exhibits a transparent material at least in the area of the at least one light outlet (28), in particular a transparent polycarbonate and/or a transparent polymethyl methacrylate.

* * * * *